US010452748B2

(12) United States Patent
Clinton et al.

(10) Patent No.: US 10,452,748 B2
(45) Date of Patent: Oct. 22, 2019

(54) DECONSTRUCTING AND RENDERING OF WEB PAGE INTO NATIVE APPLICATION EXPERIENCE

(71) Applicant: MICROSOFT TECHNOLOGY LICENSING, LLC, Redmond, WA (US)

(72) Inventors: Nathaniel T. Clinton, Redmond, WA (US); Andrew C. Haon, Seattle, WA (US); Kin Man Yau, Bellevue, WA (US); Karl Thompson, Redmond, WA (US); Zhihua Dong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 210 days.

(21) Appl. No.: 15/294,033

(22) Filed: Oct. 14, 2016

(65) Prior Publication Data
US 2017/0364480 A1 Dec. 21, 2017

Related U.S. Application Data

(60) Provisional application No. 62/352,121, filed on Jun. 20, 2016.

(51) Int. Cl.
*G06F 17/21* (2006.01)
*G06F 17/24* (2006.01)
(Continued)

(52) U.S. Cl.
CPC ........ *G06F 17/211* (2013.01); *G06F 16/9577* (2019.01); *G06F 17/248* (2013.01);
(Continued)

(58) Field of Classification Search
CPC .................................................... G06F 17/211
See application file for complete search history.

(56) References Cited

U.S. PATENT DOCUMENTS 7,246,131 B2    7/2007 Lehmann et al.
7,577,639 B2 *  8/2009 Rege et al. ............. G06F 17/30
                       (Continued)

OTHER PUBLICATIONS

Anderson, Bill, "Better Websites through Deconstruction", Published on: Nov. 30, 2013 Available at: http://www.iamtherealbill.com/2013/11/better-websites-through-deconstruction/.
(Continued)

*Primary Examiner* — James J Debrow
(74) *Attorney, Agent, or Firm* — Michael Best & Friedrich LLP

(57) ABSTRACT

A lack of available responsive options for existing web sites and/or pages, and the wide spectrum under which they fall presents a challenge for a satisfying mobile user experience (UX) with a hosted collaboration service. Templates used to create a site and/or page may each have capabilities and features which "cross-over" into other templates. Deconstructing and rendering a web page into a native application experience at a mobile client may highlight a template's functionality to enhance the UX. For example, a server side application programming interface (API) may be provided for the mobile UX, a type of a page to be rendered may be determined, the page may be deconstructed into pieces, and the deconstructed pieces may be provided to rebuild the page at the mobile client natively. The page may be rendered on the mobile client with added elements based on the deconstructed pieces to enhance the mobile UX.

20 Claims, 12 Drawing Sheets

(51) Int. Cl.
*H04L 12/58* (2006.01)
*H04L 29/08* (2006.01)
*H04L 29/06* (2006.01)
*G06F 16/957* (2019.01)
*G06F 3/0482* (2013.01)

(52) U.S. Cl.
CPC .............. *H04L 51/04* (2013.01); *H04L 67/02* (2013.01); *H04L 67/42* (2013.01); *G06F 3/0482* (2013.01); *H04L 67/20* (2013.01)

(56) References Cited

U.S. PATENT DOCUMENTS

| | | | |
|---|---|---|---|
| 7,900,149 B2 | 3/2011 | Hatcher et al. | |
| 8,560,731 B2 | 10/2013 | Wu | |
| 9,075,960 B2 | 7/2015 | Gorman et al. | |
| 2004/0205568 A1 | 10/2004 | Breuel et al. | |
| 2005/0138550 A1 | 6/2005 | Dermler et al. | |
| 2008/0139191 A1* | 6/2008 | Melnyk ............ | G06F 17/30905 455/419 |
| 2009/0228782 A1 | 9/2009 | Fraser | |
| 2010/0191574 A1 | 7/2010 | Ziemann | |
| 2014/0122595 A1* | 5/2014 | Murdoch ............. | C03C 21/002 709/204 |
| 2015/0058355 A1 | 2/2015 | Naqvi | |
| 2016/0321278 A1* | 11/2016 | Naqvi ..................... | G06F 17/30 |

OTHER PUBLICATIONS

"MobileFirst client-side API", Retrieved on: Jun. 20, 2016 Available at: https://www.ibm.com/support/knowledgecenter/SSHSCD_6.3.0/com.ibm.worklight.apiref.doc/apiref/c_client_api.html.

Brody, Hartley, "How I Mobile Optimized My Website in 5 Minutes", Retrieved on: Jun. 20, 2016 Available at: https://blog.hartleybrody.com/how-i-mobile-optimized-my-website-in-5-minutes/.

"International Search Report and Written Opinion Issued in PCT Application No. PCT/US2017/036930", dated Aug. 16, 2017, 9 Pages.

Budiu, Raluca, "Mobile: Native Apps, Web Apps, and Hybrid Apps", Retrieved from <<https://www.nngroup.com/articles/mobile-native-apps/>>, Sep. 14, 2013, 11 Pages.

* cited by examiner

DECONSTRUCTING AND RENDERING OF WEB PAGE INTO NATIVE APPLICATION EXPERIENCE

CROSS-REFERENCE TO RELATED APPLICATION

This application claims benefit under 35 U.S.C. § 119(e) of U.S. Provisional Application No. 62/352,121 filed on Jun. 20, 2016. The U.S. Provisional application is herein incorporated by reference in its entirety.

BACKGROUND

Lack of available responsive options for existing web sites, and the wide spectrum under which sites and/or pages can fall presents a challenge for a satisfying user experience with hosted services, such as a collaboration service. There may be multiple templates that can be used to create a site and/or page, and within those templates, there may be capabilities and features provided to "cross-over" into other templates. For example, a user may create a publishing page from a Team Site template and vice versa.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to deconstructing and rendering a web page into a native application experience. A server side application programming interface (API) may be provided for a mobile user experience. A type of a page to be rendered may be determined, the page may be deconstructed into pieces based on the determined type, and the deconstructed pieces of the page may be provided to rebuild the page at a mobile client natively, where the page may be rendered on the mobile client with added elements based on the deconstructed pieces to enhance the mobile user experience.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
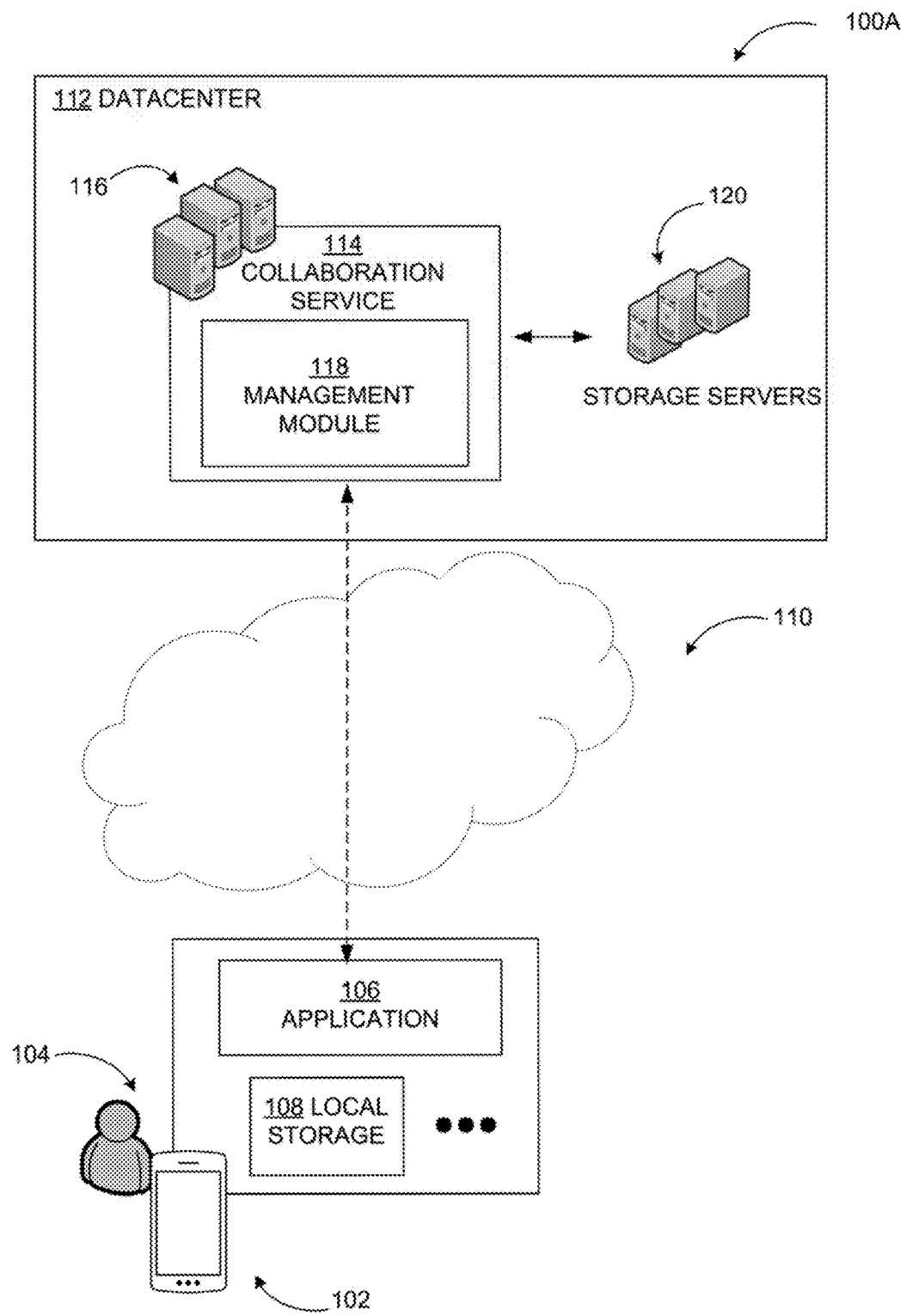
FIGS. 1A-C include display diagrams illustrating example network environments where deconstructing and rendering of a web page into a native application experience may be implemented.

As briefly described above, embodiments are directed to deconstructing and rendering a web page into a native application experience. Multiple templates may be used to create a site and/or page, and within those templates, there may be capabilities and features provided to "cross-over" into other templates. Example embodiments build a user experience that takes the known components and features available within each template and showcase them, along with mobile-only functionality, to render an improved mobile user experience and a more performant experience on a mobile client. Two systems may be used to facilitate example embodiments. The first system may be a server side system associated with the hosted service, which may provide application programming instances (APIs) to determine a type of a page to be rendered, deconstruct pieces of the page based on the determined type, and provide the deconstructed pieces that the mobile client may use to rebuild the web page natively. In some cases, the mobile client may use the deconstructed pieces to rebuild the web page in a hybrid native-web fashion. The second system may be a client side system, where the mobile client associated with the hosted service (for example, a locally installed application associated with the hosted service) may form a native experience from the deconstructed pieces by taking the desirable and/or compatible components and features of the web and applying them in a mobile friendly fashion. For example, the mobile client may construct a base user experience that is familiar to mobile device users. Then, based on the page type to be rendered and the available deconstructed pieces for the site and/or page, the mobile client may add elements to the user experience to highlight that template's purpose and functionality.

Deconstructing a web page as used herein refers to programmatic separation of components that form a web page such that individual components can be modified, customized, and rendered in a mobile environment. An original web page may be programmatically designed as an integrated piece, that is, different views, components, and elements may be part of an integrated piece of software. For example, the web page may include a navigation view, a service view, a tab view, and so on. A system according to embodiments may programmatically separate the views and transmit to a mobile client such that the mobile client can customize the different views, add or remove elements, and select which ones to render natively, that is using local style and sources for the mobile client. The added elements may include control elements such as buttons, links, and others that may be functionally or stylistically customized for the mobile environment.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide deconstructing and rendering of a web page into a native application experience. Examples of platforms include, but are not limited to, a hosted service executed over a plurality of servers, an application executed on a single computing device, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

Figure 1B:
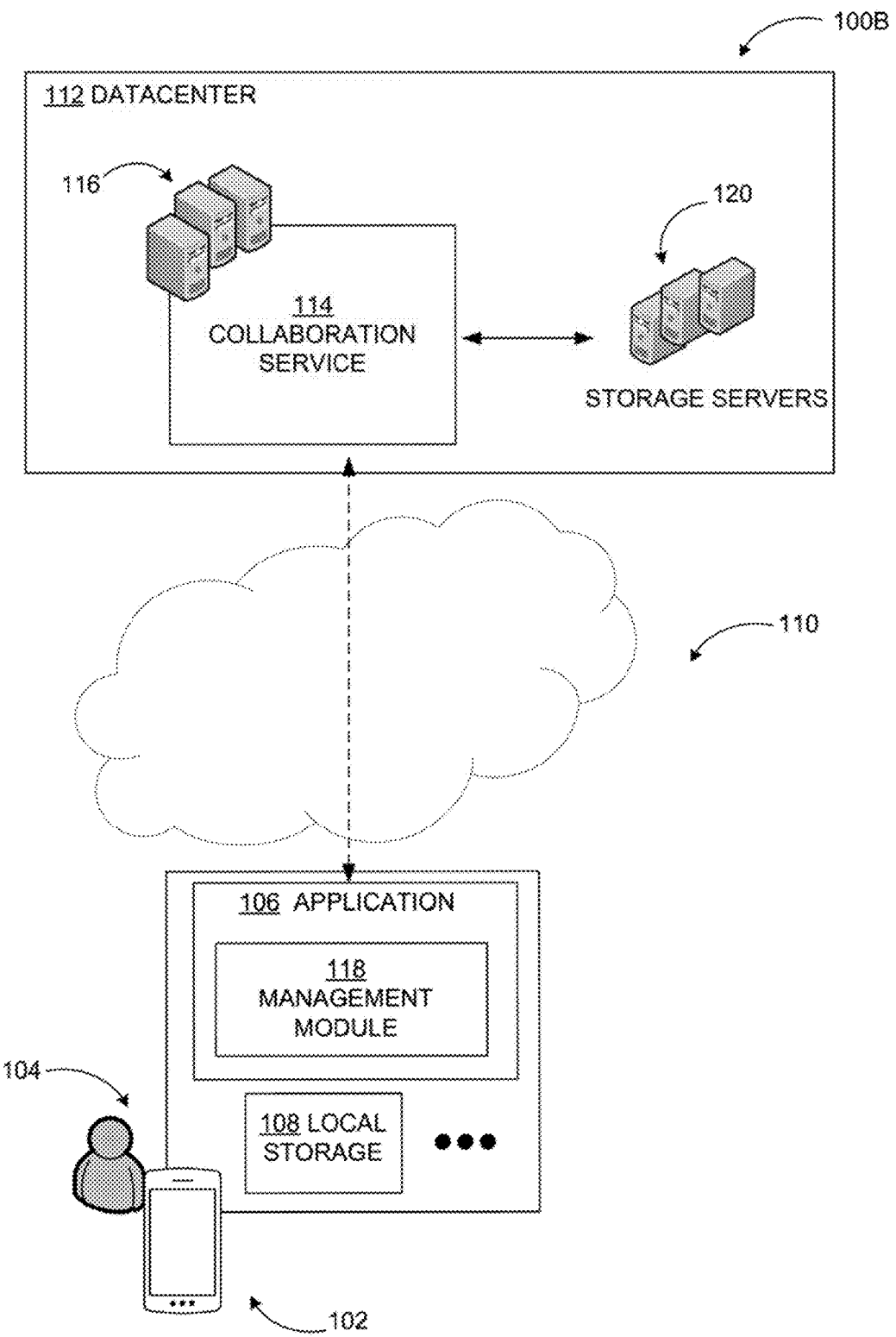
Figure 1C:
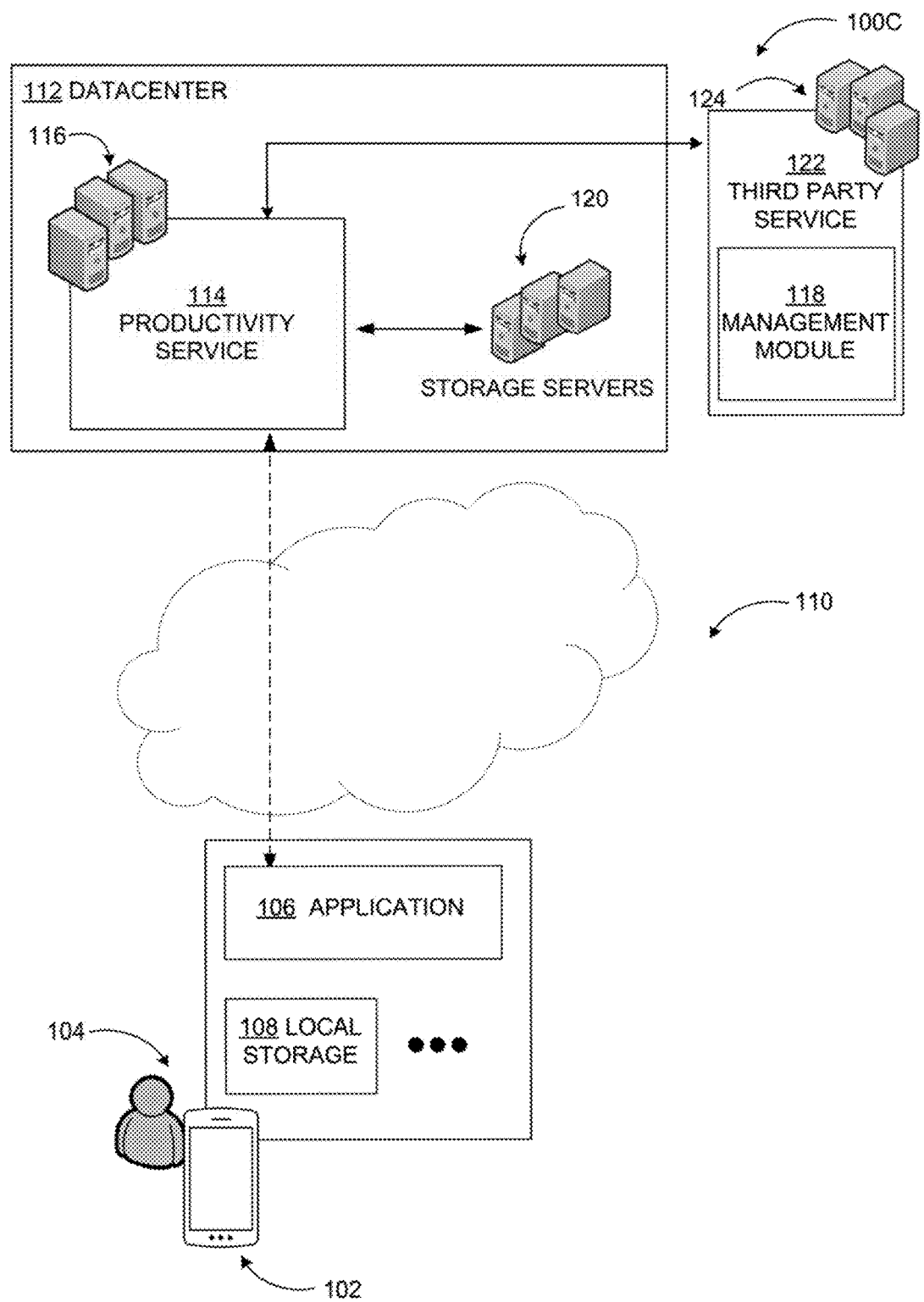

FIGS. 1A-C include display diagrams illustrating example network environments where deconstructing and rendering of a web page into a native application experience may be implemented. As illustrated in diagrams 100A-C, an example system may include a datacenter 112 hosting a cloud-based collaboration service 114 configured to enable users to create, edit, and/or share content among multiple devices and across a variety of platforms. The datacenter 112 may include one or more processing servers 116 configured to execute the collaboration service 114, among other components. The datacenter 112 may also include one or more storage servers 120 configured to manage one or more data stores comprising data associated with the collaboration service 114. As described herein, the collaboration service 114 may be implemented as software, hardware, or combinations thereof.

In some embodiments, the collaboration service 114 may be configured to interoperate with various applications. For example, as illustrated in the diagrams 100A-C, a user 104 may execute a thin (e.g., a web browser) or a thick (e.g., a locally installed client application) version of an application 106 through a device 102 with which the collaboration service 114 may be configured to integrate and interoperate with over one or more networks, such as network 110. The application 106 may be an application hosted by the collaboration service 114. The device 102 may include a desktop computer, a laptop computer, a tablet computer, a vehicle mount computer, a smart phone, or a wearable computing device, among other similar devices. A communication interface may facilitate communication between the collaboration service 114 and the application 106 over the network 110.

In one embodiment, as illustrated in diagram 100A, at least one of the processing servers 116 may be operable to execute a management module 118 of the collaboration service 114, where the management module 118 may be integrated with the collaboration service 114 to deconstruct and render a web page into a native application experience. In another embodiment, as illustrated in diagram 100B, the application 106 may be operable to execute the management module 118, where the management module 118 may be integrated with the application 106. In a further embodiment, as illustrated in diagram 100C, the management module 118 may be a separate module associated with and/or executed by one or more processing servers 124 of a third party service 122 configured to serve multiple applications, such as the application 106 of the collaboration service 114.

In an example embodiment, the management module 118 may be configured to provide a server side API for a user experience of the application 106 that is executing on the device 102. The management module 118 may determine a type of a page to be rendered. Example types may include a site page, a group page, a blog page, and a video channel page hosted by a collaboration service. The management module 118 may deconstruct the page into pieces based on the determined type. The deconstructed pieces of the page may include one or more of a service view, a tab view, a page view, and a navigation view. In an example scenario, the type of page to be rendered may be a site page, and the deconstructed pieces may include a collaboration service view, a site tab view, a site page view, and a navigation view. In one embodiment, the management module 118 may deconstruct the entire page into the deconstructed pieces. In another embodiment, the management module 118 may deconstruct only portions of the page in a hybrid fashion. The management module 118 may then provide the deconstructed pieces of the page to the application 106 such that the page may be rebuilt at the application 106 natively. In some embodiments, the application 106 may utilize the API to "pre-fetch" the deconstructed pieces from the management module 118, when possible, to ensure a performant rendering and consumption experience.

The page may be rendered with added elements based on the deconstructed pieces. For example, the application 106 may construct a base user experience that is familiar to the user 104. Then, based on the determined page type to be rendered and the available deconstructed pieces for the site and/or page provided by the management module 118, the application 106 may add elements to the user experience to highlight the most desirable and/or compatible components and features of the page to ensure a satisfying user experience for display on the device 102. For example, the added elements based on the deconstructed pieces of the service view may include a tab bar comprising one or more tabs; the added elements based on the deconstructed pieces of the tab view may include one or more pivots that each comprise a list of content items associated with the respective pivot; the added elements based on the deconstructed pieces of the page view may include a header, an action bar, and an activity feed; and the added elements based on the deconstructed pieces of the navigation view may include pinned content and one or more links. The deconstructed pieces, added elements, and/or rendered page may be stored within local storage 108 of the device 102.

As previously discussed, a lack of available responsive options for existing web sites, and the wide spectrum under which sites and/or pages can fall presents a challenge for a satisfying user experience with hosted services, such as a collaboration service. There may be multiple templates that can be used to create a site and/or page, and within those templates, there may be capabilities and features provided to "cross-over" into other templates. Embodiments, as described above in FIG. 1, for deconstructing and rendering a web page into a native application experience enable elements to be added to or detracted from the client's user experience to highlight a template's purpose and functionality based on a determined page type to be rendered and available deconstructed pieces for the site and/or page. This may increase usability and improve user interaction by allowing users to access full site features and functionality through mobile platforms efficiently and with a consistent experience without having to install and employ custom solutions. Additionally, deconstructing and rendering a web page into a native application experience may reduce processing and network bandwidth usage because only the most desirable and/or compatible components and features (not "all") of the web site or page are applied when forming the native experience from the deconstructed pieces. Moreover, deconstructing and rendering a web page into a native application experience may increase security and efficiency in user interaction and data management.

Embodiments, as described herein, address a need that arises from very large scale of operations created by software-based services that cannot be managed by humans. The actions/operations described herein are not a mere use of a computer, but address results of a system that is a direct consequence of software used as a service offered in conjunction with creation, editing, and/or sharing of content through collaboration services hosted across a variety of platforms and devices, specifically mobile platforms and devices.

Figure 2:
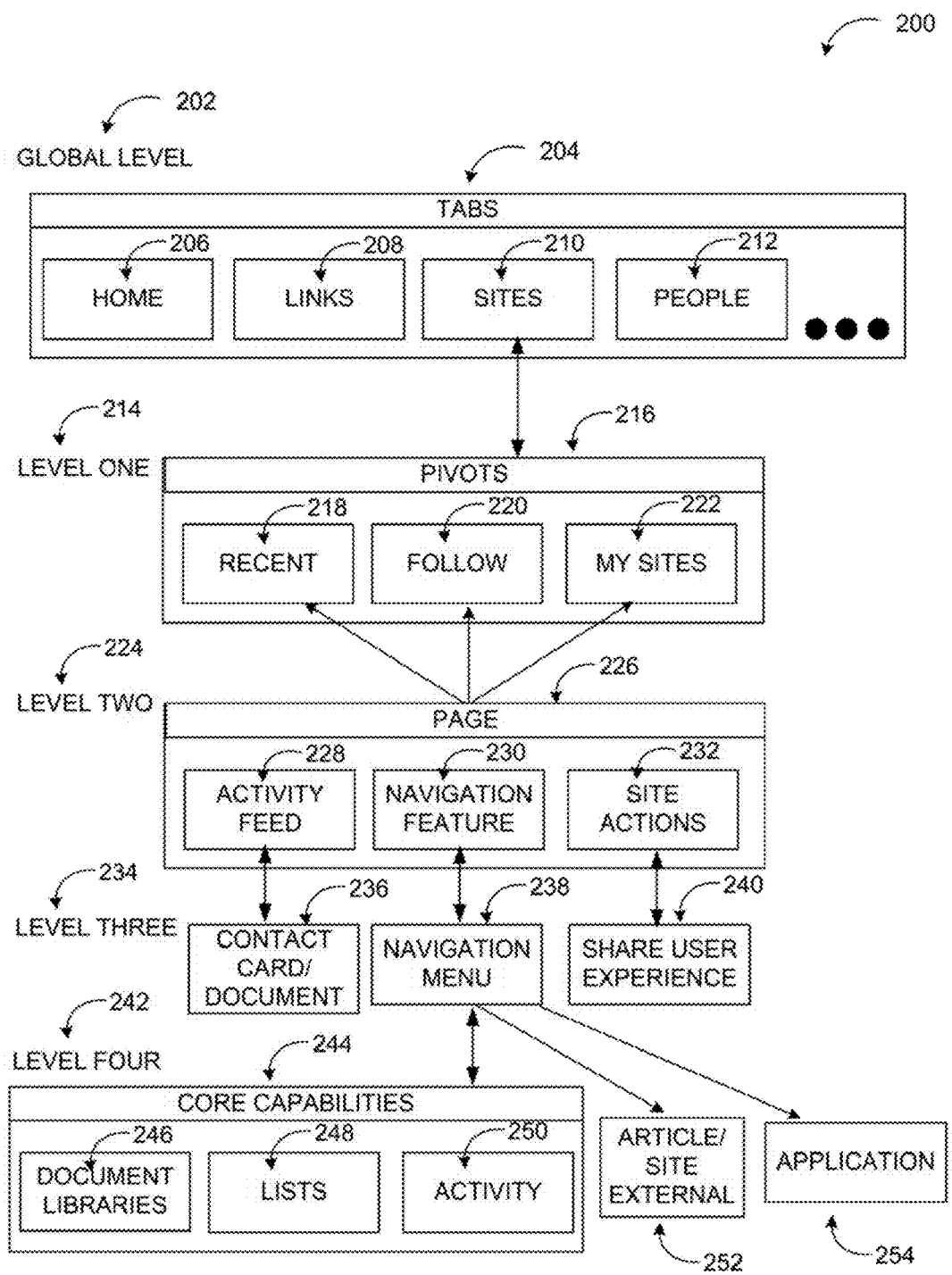
FIG. 2 includes a display diagram illustrating an example architecture for a mobile user experience following deconstruction and rendering of a web page into a native application experience.

FIG. 2 includes a display diagram illustrating an example architecture for a mobile user experience following deconstruction and rendering of a web page into a native application experience. As previously discussed in conjunction with FIG. 1, a management module associated with a collaboration service may be configured to provide deconstructing and rendering of a web page into a native application experience. The management module may provide a server side API for a mobile user experience, determine a type of a page to be rendered, deconstruct the page into pieces based on the determined type, and provide the deconstructed pieces of the page to rebuild the page at a mobile client natively, where the page may be rendered on the mobile client with added elements based on the deconstructed pieces to enhance the mobile user experience.

As shown in a diagram 200, the mobile user experience for the collaboration service may comprise various levels, including a global level user experience 202, a level one user experience 214, a level two user experience 224, a level three user experience 234, and a level four user experience 242. One or more templates may be used to create each level, and within each of those templates, there may be components, capabilities, and features provided to "cross-over" into templates for other levels. Deconstructing and rendering of a web page hosted by the collaboration service into a native application experience may enable showcasing of the known components and features available within each template, along with mobile-only functionality, within the mobile user experience to render an improved user experience and a more performant experience.

The global level user experience 202 (or a collaboration service view) may be displayed upon execution of the mobile client on a device (for example, a locally installed application associated with the collaboration service on the device). The global level user experience 202 may comprise one or more tabs 204. The tabs 204 may include a home tab 206, a links tab 208, a sites tab 210, a people tab 212, and an option to view more tabs. The home tab 206 may be the default tab selected upon execution of the mobile client. In an example scenario, a user of the mobile client may select the sites tab 210 through the global level user experience 202.

In response to the selection of the sites tab 210, the level one user experience 214 (or a sites tab view) may be displayed. The level one user experience 214 may include one or more pivots 216. The pivots 216 may include "Recent" 218, "Follow" 220, and "My Sites" 222. Each of the pivots 216 may include a list of sites that fall under the respective category of the pivots 216. For example, the list of sites for "Recent" 218 may include the recent sites visited by the user, the list of sites "Follow" for may include the sites followed by the user, and the list of sites for "My Sites" 223 may include the sites associated with the user. The user may select one of the pivots 216, and a site from within the list of sites for the respective selected pivot.

In response to selection of the site, the level two user experience 224 (or site page view) may be displayed. The level two user experience 224 may include a page 226 that comprises an activity feed 228 associated with the site, a navigation feature 230 to enable navigation within the site and/or between the site and another related site, and site actions 232, such as a share, follow, or favorite action. The level three user experience 234 comprises individual components and/or elements associated with each of the features provided by the level two user experience 224. In one example, contact cards and/or documents 236 associated with activity displayed in the activity feed 228 may be displayed upon selection of an entry within the activity feed 229. In another example, control elements that enable site actions to be executed, such as a share user experience 240 may be displayed upon selection of the share site action. In a further example, a navigation menu 238 may be displayed upon selection of the navigation feature 230.

The level four user experience 242 may display the core capabilities 244 of the navigation menu 238. These capabilities may include, accessing pinned content, such as document libraries 246, lists 248, and activity 250. The level four user experience 242 may also display links within the navigation menu 238, where the links may enable the user to navigate to articles or external sites 252 and/or a web-based version of the application 254 hosted by the collaboration service.

Figure 3:
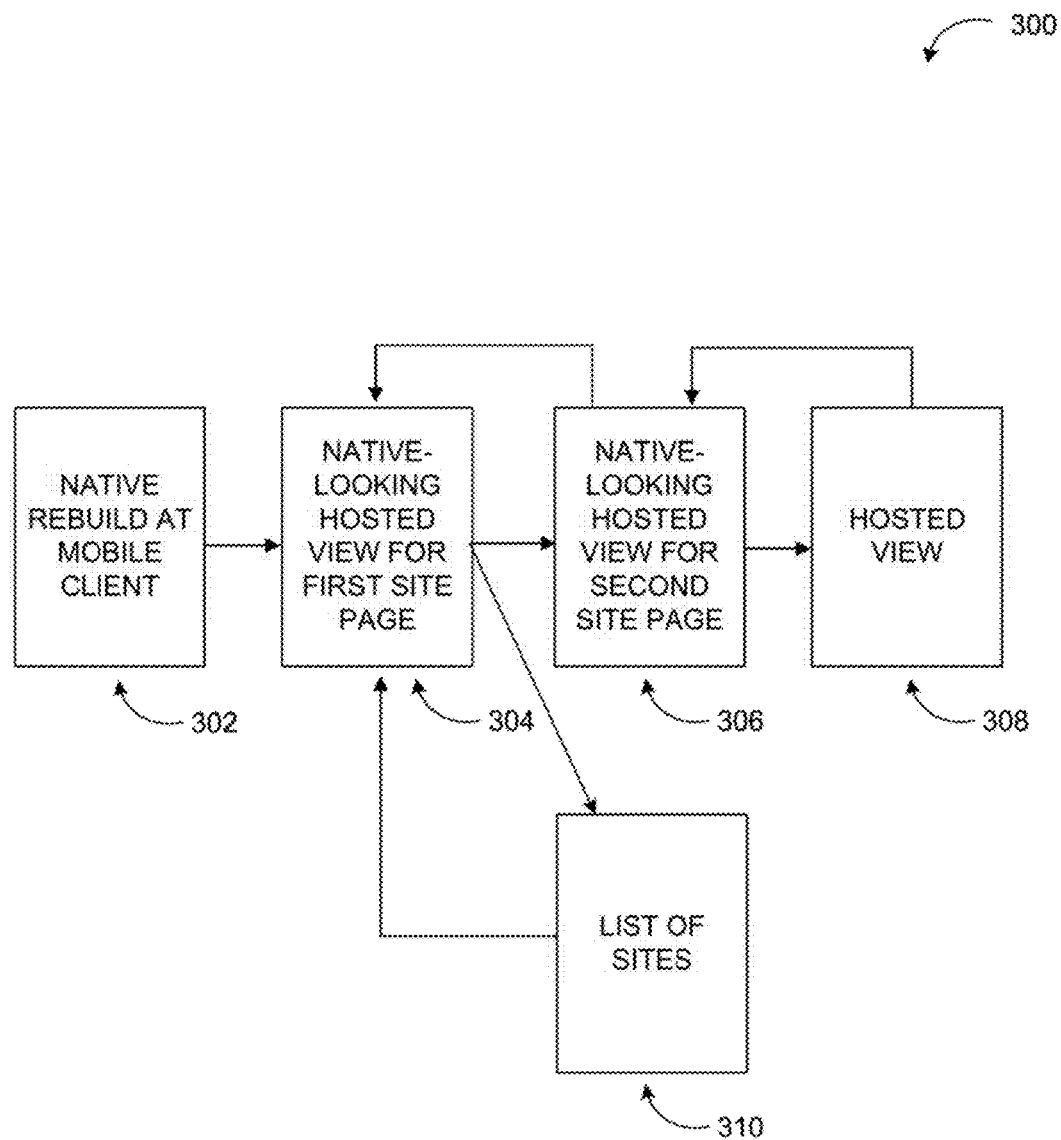
FIG. 3 includes a display diagram illustrating an example path for deconstructing and rendering of a web page into a native application experience.

FIG. 3 includes a display diagram illustrating an example path for deconstructing and rendering of a web page into a native application experience. As previously discussed in conjunction with FIG. 1, a management module associated with a collaboration service may be configured to provide deconstructing and rendering of a web page into a native application experience. The management module may provide a server side API for a mobile user experience, determine a type of a page to be rendered, deconstruct the page into pieces based on the determined type, and provide the deconstructed pieces of the page to rebuild the page at a mobile client natively, where the page may be rendered on the mobile client with added elements based on the deconstructed pieces to enhance the mobile user experience.

As shown in a diagram 300, the deconstructed pieces of the page may enable the mobile client to rebuild the page natively 302. The page may be rendered on the mobile client as a native-looking hosted view for first site page 304, which may include added elements based on the deconstructed pieces to enhance the mobile user experience. The native-looking hosted view for first site page 304 may display a sites tab view, for example, that includes one or more selectable pivots. Each of the pivots may include a list of sites 310 that fall under the respective category of the pivots. Upon selection of one of the pivots, the respective list of sites 310 may be retrieved and displayed within the native-looking hosted view for first site page 304.

Upon a further selection of a site from within the list of sites 310, the native-looking hosted view for second site page 306 may be displayed. The native-looking hosted view for second site page 306 may be a site page view, for example, that includes an activity feed associated with the site, a navigation feature to enable navigation within the site and/or between the site and another related site, and site actions, such as a share, follow, or favorite action.

The hosted view 308 may display the site or site page as it appears on the web application hosted by the collaboration service. The hosted view 308 may be displayed within the mobile user experience in various scenarios. In one example scenario, a user may choose to view the web application version of the site or page. For example, the user may select a link to the web application within a navigation menu of the navigation feature displayed within the native-looking hosted view for second site page 306. In other example scenarios, the hosted view 308 may be displayed if the site or page being viewed is a custom site, an external site, or is rendered by an application that is not supported natively. The site or page may behave as expected within the web application version of the site or page.

Figure 4:
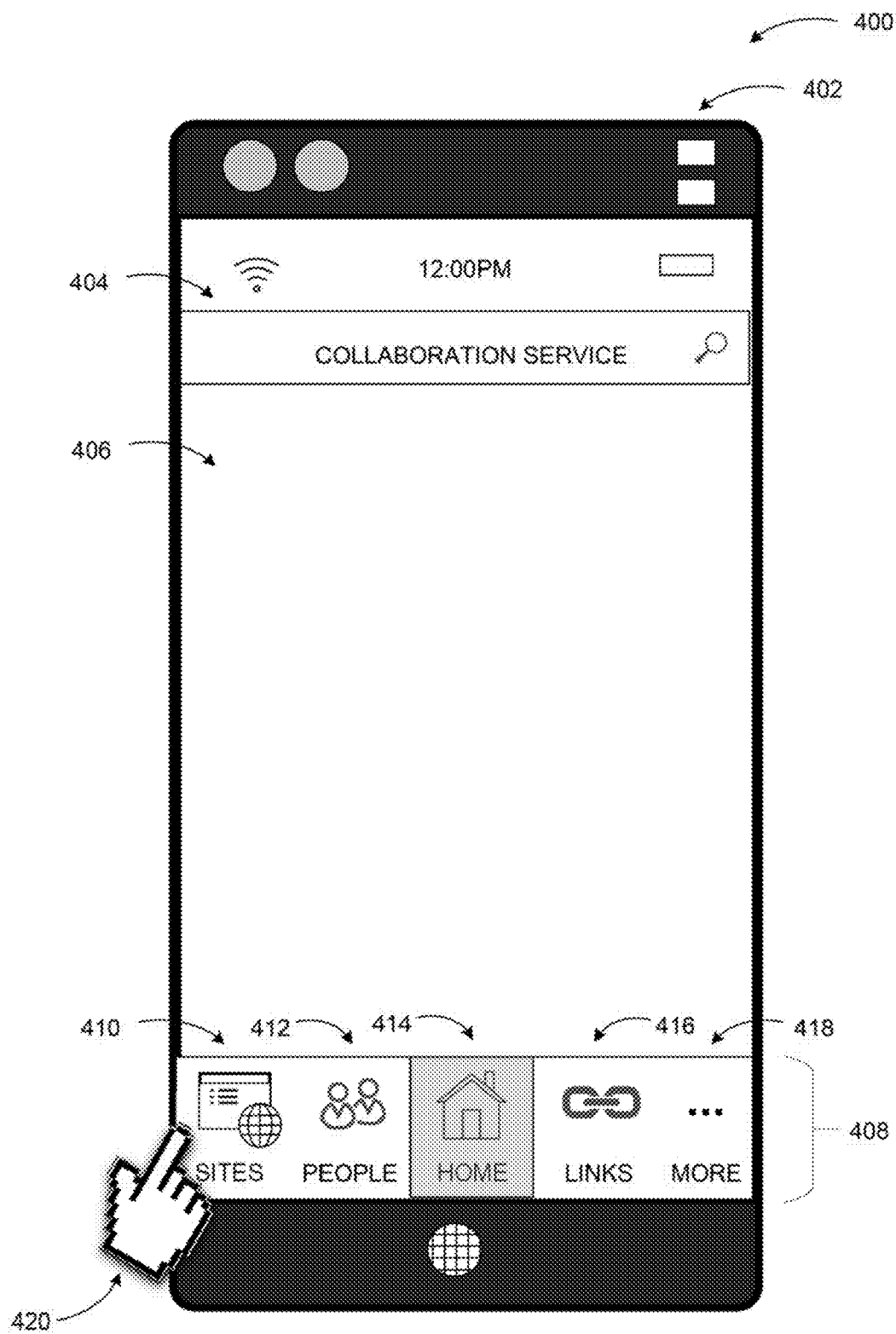
FIG. 4 includes a display diagram illustrating an example service view of a deconstructed and rendered web page within a mobile user experience displayed on a device.

FIG. 4 includes a display diagram illustrating an example service view of a deconstructed and rendered web page within a mobile user experience displayed on a device. A web page hosted by a collaboration service may be deconstructed and rendered natively on a mobile client (for example, a locally installed client application of the collaboration service on a mobile device), where elements may be added to or detracted from the mobile user experience to highlight the most desirable and/or compatible components and features of the page to ensure a satisfying mobile user experience.

As shown in a diagram 400, upon execution of a client application of the collaboration service on a mobile device 402, a user experience 404 associated with collaboration service may be presented through a display of the mobile device 402. A collaboration service view 406 may initially be displayed within the user experience 404. The collaboration service view 406 may include one or more tabs positioned within a tab bar 408, such as a home tab 414, a sites tab 410, a people tab 412, a links tab 416, and a further option to view more tabs 418. As illustrated, the default tab displayed upon execution of the client application may be the home tab 414. One or more of a textual scheme, a graphical scheme, a formatting scheme, an animation scheme, a coloring scheme, a highlighting scheme, and/or a shading scheme may be employed to indicate which tab is currently selected within the collaboration service view 406.

A user may be enabled to select another tab from the tab bar 408 through one of a touch action, an optically-captured gesture action, a movable input device action, a mouse input, a keyboard input, and/or an eye-tracking action associated with the other tab, among other types of user input. For example, the user may select the sites tab 410 by contacting the display screen of the mobile device 402 with his finger 420 over the area in which the sites tab 410 is located, as illustrated.

Figure 5:
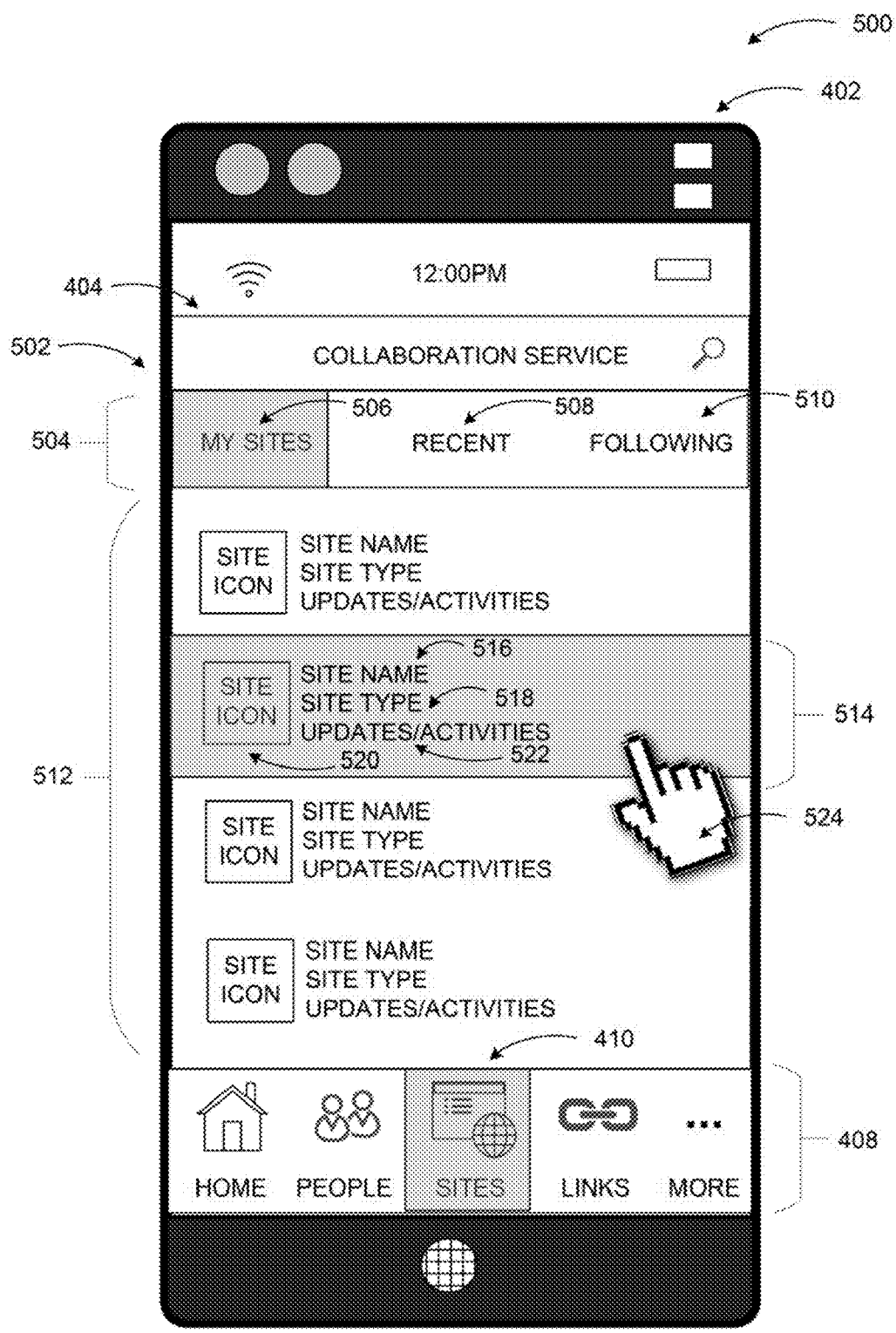
FIG. 5 includes a display diagram illustrating an example tab view of a deconstructed and rendered web page within a mobile user experience displayed on a device.

FIG. 5 includes a display diagram illustrating an example tab view of a deconstructed and rendered web page within a mobile user experience displayed on a device.

As shown in a diagram 500, in response to detecting a user selection of the sites tab 410 within the tab bar 408 of the collaboration service view, as discussed above in conjunction with FIG. 4, a sites tab view 502 may be displayed within the user experience 404. As illustrated, the sites tab 410 may be re-located within the tab bar 408 such that it is centered among the tabs, and may be shaded, among other schemes, to indicate that the sites tab 410 is currently selected. The sites tab view 502 may include one or more pivots provided for display within a pivot bar 504. The pivots may include a "My Sites" pivot 506, a "Recent" pivot 508, and a "Following" pivot 510. As illustrated, the default pivot displayed in response to detecting a user selection of the sites tab 410 within the tab bar 408 may be the "My Sites" pivot 506. One or more of a textual scheme, a graphical scheme, a formatting scheme, an animation scheme, a coloring scheme, a highlighting scheme, and/or a shading scheme may be employed to indicate which pivot is currently displayed within the sites tab view 502.

Each of the pivots within the pivot bar 504 may include a list of sites 512 that fall under the respective category of the pivots. For example, the list of sites in the "My Sites" pivot 506 may include sites associated with the user, the list of sites in the "Recent" pivot 508 may include recent sites visited by the user, and the list of sites in the "Following" pivot 510 may include sites followed by the user. The pivot bar 504 may remain stationary at the top of sites tab view 502 as the user scrolls through the list of sites 512 for a pivot. The list of sites 512 for each pivot may refresh when the sites tab view 502 and/or the pivot is loaded or when a pull down gesture is activated by the user. The user may perform an action on a pivot to navigate to the corresponding pivot on which the action was performed. Swiping anywhere on the user experience 404 may also cause the current pivot to change to an alternative pivot. For example, if the user is currently on the "Recent" pivot 508, the user may swipe left to move to the "Following" pivot or may swipe right to move to the "My Sites" pivot 504. Movement may stop when the leftmost or rightmost of the pivots is reached. Similarly, if the user performs an action on the currently selected pivot, no action results.

Each site within the list of sites 512 may be presented as a card 514. For example, the card 514 may include one or more of a site name 516 a site type 518, a site icon 520, any updates and/or activities 522 associated with the site, and whether or not the site is followed, among other examples. The site name 516 may be displayed in full unless it contains too many characters, in which case the site name 516 may be truncated with an ellipsis. The site type 518 may include one or more of "Site", "Group", "Blog" or "Video Channel", among other examples. When available, the site icon 520 may be populated with a suitably sized image from the site. If not available, or if the image is not sized correctly, the site icon 520 may be created for the site. The created site icon 520 may include a color and one or more initials of the site name 516 (for example, an initial for the first and second words in the site name 516). The updates and/or activities 522 associated with the site may be displayed differently based on a number of the updates and/or activities. In one example, if there have been no updates and/or activities on the site, no text is displayed. In another example, if there has been one update and/or activity on the site, brief details associated with that update and/or activity may be displayed. In a further example, if there has been more than one update and/or activity on the site, the following text is displayed: N updates/activities, where N is the number of updates/activities available. The updates and/or activities 522 may continue to be displayed on the card 514 until the user has visited an activity feed associated with site (see FIG. 6A below, where the activity feed is an element of a site page view). Once visited, the updates and/or activities count may be reset and the text removed from the card 514. The card 514 may also include a graphical icon, such as a star if the site is followed.

Each pivot within the pivot bar 504 may display the cards representing each of the respective sites in a same layout and/or format to ensure the user experience 404 is consistent within the sites tab view 502. An action applied to any area within the card 514 may launch the user into a corresponding site page view for that site, as discussed in further detail in conjunction with FIG. 6A below. The action may include a touch action, an optically-captured gesture action, a movable input device action, a mouse input, a keyboard input, and/or an eye-tracking action. For example, the user may select the site by contacting the display screen of the mobile device 402 with his finger 524 over any area within the card 514, as illustrated.

In certain scenarios, a custom user experience may replace and/or be displayed in conjunction with the sites tab view 502. For example, when the list of sites 512 for a pivot is loading, a loading view may be displayed within the user experience 404 employing an animated loading image, and "Loading . . . " text. For further example, if the user goes offline, a "No internet connection" banner may be displayed within the user experience. When the user goes offline, the pivots and respective lists of sites should still be visible and selectable by the user. However, no updates may be available until the online connection is re-established. Additionally, if a pivot does not contain any sites within their respective list of sites, an empty image and/or text notification may be displayed. Similarly, when errors in displaying the list of sites associated with the one or more pivots are detected, an error image and/or text notification may be displayed. In some embodiments, direct access to a "Try again" action to attempt to reload the list of sites may be provided.

Figure 6A:
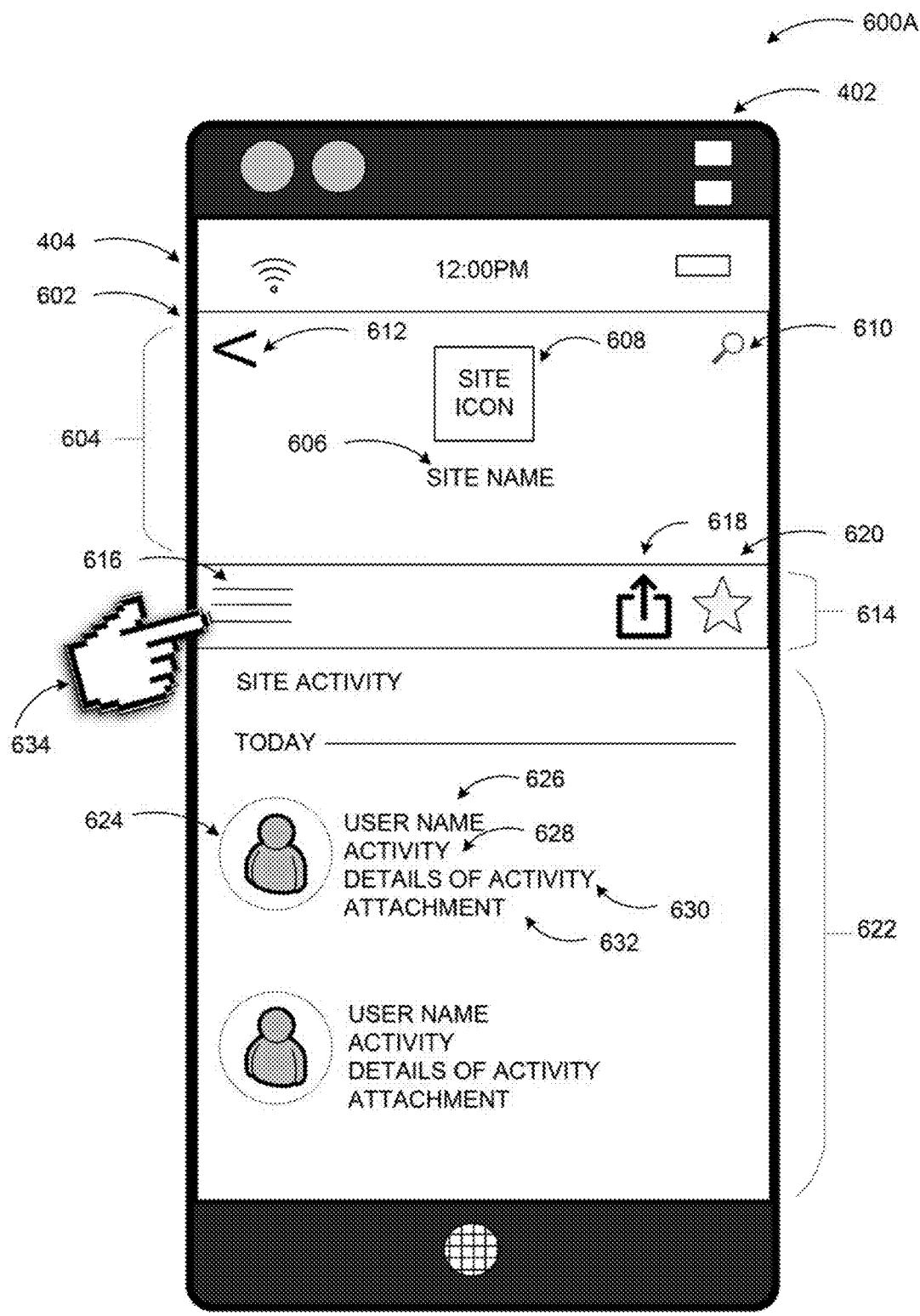
FIGS. 6A-B include display diagrams illustrating examples of a page view and a navigation view of a deconstructed and rendered web page within a mobile user experience displayed on a device.
Figure 6B:
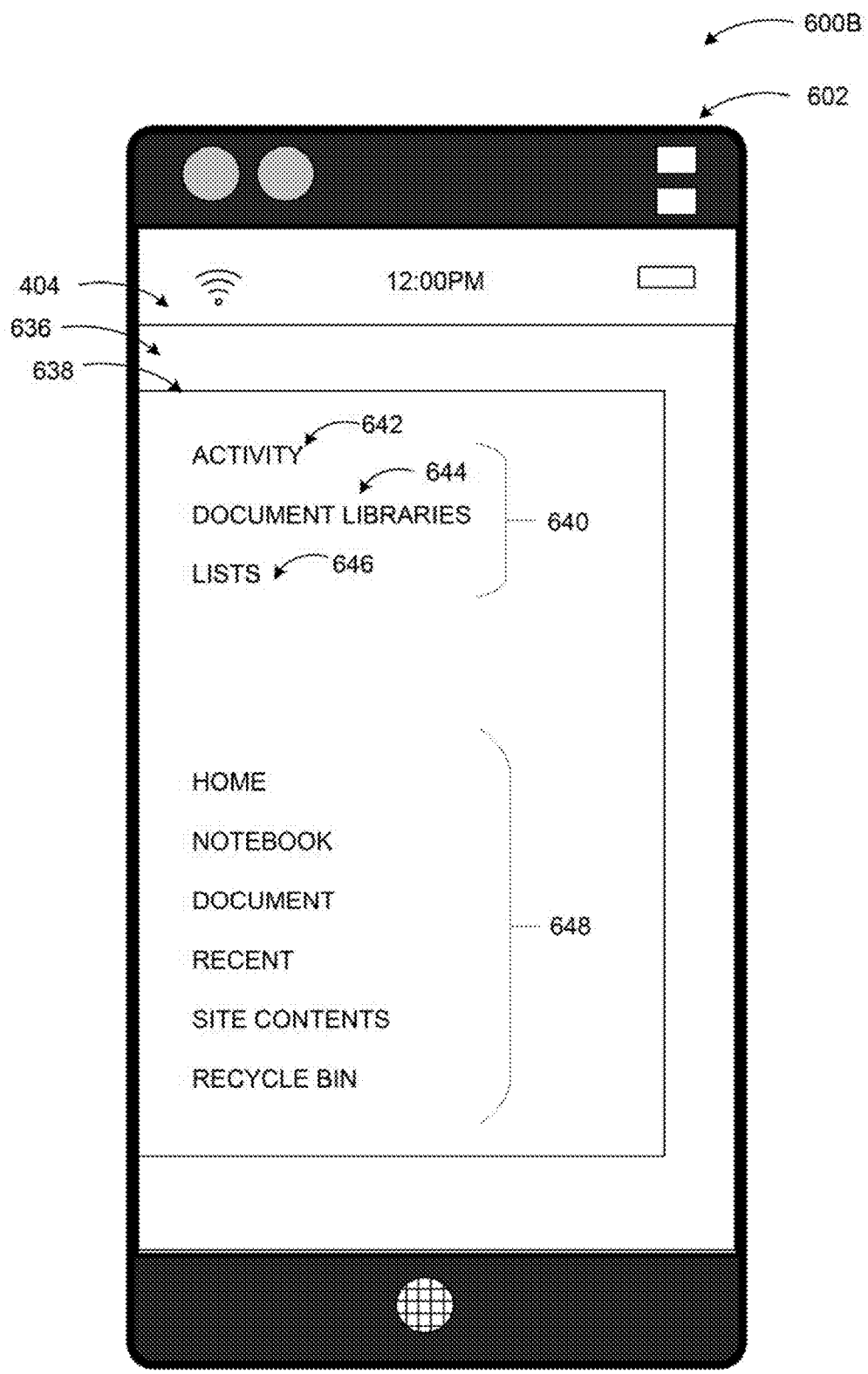

FIGS. 6A-B include display diagrams illustrating examples of a page view and a navigation view of a deconstructed and rendered web page within a mobile user experience displayed on a device. As previously discussed in conjunction with FIGS. 4 and 5, a sites tab view of the user experience 404 may include one or more pivots, where each of the pivots may include a list of sites that fall under the respective category of the pivots. Each of the sites within the list may be presented as cards, and once a user performs an action on any area within such a card, a site page view 602 for the site represented by the card may be displayed within the user experience 404, as illustrated in in diagram 600A. The site page view 602 may include a header 604, an action bar 614, and an activity feed 622.

The header 604 may include a site name 606, a site icon 608, and one or more navigational elements, such as a search command element 610 and a back command element 612. The site name 606 and the site icon 608 may be the same name and icon presented within the card for the site in the sites tab view as described in conjunction with FIG. 5. The action bar 614 may enable site navigation through a navigation feature 616, as well as include options to share and/or follow the site through a share feature 618 and a follow feature 620, respectively. A graphical icon, such as a star, associated with the follow feature 620 may be displayed in the action bar 614. The follow feature may be represented by one or two states, "Not followed" and "Followed". "Not followed" may be represented by an empty star that indicates that the site is not currently followed, and "Followed" may be represented by a solid star that indicates the site is currently followed. The graphical icon associated with the follow feature 620 may toggle between "Followed" and "Not followed" states when selected and/or unselected by the user. If the user selects to follow the site while offline, the change in state may be queued up and submitted once an online connection has been re-established.

The header 604 and the action bar 614 may also include a site background color. The site background color may change based on the site color specified by an administrator of site. In one embodiment, the background may be comprised of two shades. For example, a lighter shade may be employed for the background in the header 604 and a darker shade may be employed for the action bar 614. In another embodiment, if available, the background color of the header 604 may be replaced with a color and/or an image used by a modern home page of the site. A logo from the modern home page may also be presented, if available. The header 604 may also be collapsible. For example, the header 604 may collapse when a user is scrolling through the site page view 602 such that only the site name 606 is displayed, along with the action bar 614, in order to conserve display space. The header 604 may expand back to full size when the user has scrolled back to the top of the site page view 602.

The activity feed 622 may be composed of metadata retrieved from the server side API associated with the collaboration service. The activity feed 622 may include a header that comprises a user name 626, an activity 628, and details 630 associated with the activity, as well as an actionable icon 624 and/or attachment 632 associated with each activity. For example, clicking on the icon 624 may open a contact card of the user associated with the activity and clicking on the attachment 632 may open up a file, document, image, and/or other content associated with the activity. The activity feed 622 may be scrollable and collapsible.

The activity feed 622 may be the default landing experience for the site page view 602. However, if the site comprises a modem home page, the modem home page may provide the client application with an app render-able section. The app render-able section may replace the activity feed 622 within the site page view 602. If replaced, the activity feed 622 may still be accessible via the navigation feature 616 within the action bar, and the user may be enabled to set the default back to the activity feed 622 if they so desire.

In response to a user selection 634 of the navigation feature 616 within the action bar 614, a navigation view 636 comprising a navigation menu 638 may be displayed within the user experience 404, as shown in the diagram 600B. The navigation menu 638 may slide out from the left of the user experience 404 to be displayed, and may slide back to the left of the user experience 404 to close in response to a user selection made outside the bounds of the navigation menu 638. Content displayed in the navigation menu 638 may be selectable, and the navigation menu 638 may be scrollable. The navigation menu 638 may include two sets of content, pinned content 640 and links 648.

The pinned content 640 may include items that are consistently presented in the navigation menu 638, such as activity 642, document libraries 644, and lists 646. Selection of activity 642 may navigate the user to the activity feed of the site page view, as described previously in diagram 600A. Selection of document libraries 644 or lists 646 may navigate the user to a document view or lists view which may also employ the user experience 404.

The links 648 may include a same set of links that would be displayed if the user selected the links tab displayed on the tab bar of the collaboration service view, as described in FIG. 4. For example, the links 648 may include a home link, a notebook link, a document link, a recent link, a site contents link and a link to a recycle bin, among other examples. The home link may be added to the links 648 if a modem home page for the site is detected. In-application logic may be implemented to handle the links 648. For example, if a link goes to a native experience, the native experience may be displayed, and if a link goes to a non-native experience, the link destination may be displayed in the user experience 404. For links with children, the children links may be indented within the navigation menu 638. Overflowing link titles may be truncated with an ellipsis at the end.

The examples provided in FIG. 1A through FIG. 6 B are illustrated with specific systems, services, applications, modules, and user experiences. Embodiments are not limited to environments according to these examples. Deconstructing and rendering a web page into a native application experience may be implemented in environments employing fewer or additional systems, services, applications, modules, and user experiences. Furthermore, the example systems, services, applications, modules, and user experiences shown in FIG. 1A through FIG. 613 may be implemented in a similar manner with other values using the principles described herein.

Figure 7:
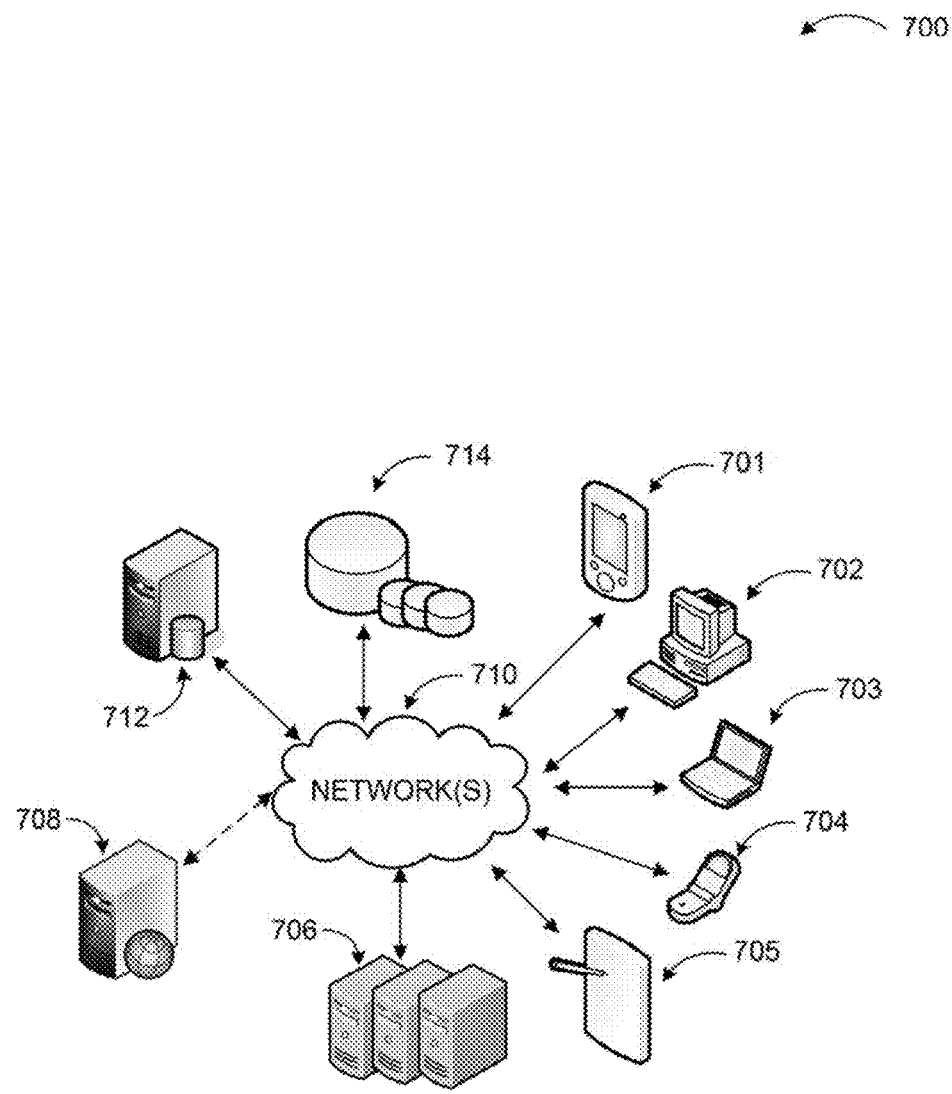
FIG. 7 is an example networked environment, arranged in accordance with at least some embodiments described herein.

FIG. 7 is an example networked environment, arranged in accordance with at least some embodiments described herein. In addition to locally installed applications (for example, application 106), a management module may also be employed in conjunction with hosted applications and services (for example, a collaboration service 114) that may be implemented via software executed over one or more servers 706 or individual server 708, as illustrated in diagram 700. A hosted service or application may communicate with client applications on individual computing devices such as a handheld computer 701, a desktop computer 702, a laptop computer 703, a smart phone 704, a tablet computer (or slate), 705 ('client devices') through network(s) 710 and control a user interface presented to users.

Client devices 701-705 are used to access the functionality provided by the hosted service or application. One or more of the servers 706 or server 708 may be used to provide a variety of services as discussed above. Relevant data may be stored in one or more data stores (e.g. data store 714), which may be managed by any one of the servers 706 or by database server 712.

Network(s) 710 may comprise any topology of servers, clients, Internet service providers, and communication media. A system according to embodiments may have a static or dynamic topology. Network(s) 710 may include a secure network such as an enterprise network, an unsecure network such as a wireless open network, or the Internet. Network(s) 710 may also coordinate communication over other networks such as PSTN or cellular networks. Network (s) 710 provides communication between the nodes described herein. By way of example, and not limitation, network(s) 710 may include wireless media such as acoustic, RF, infrared and other wireless media.

Many other configurations of computing devices, applications, engines, and modules may be employed to provide deconstructing and rendering of a web page into a native application experience. Furthermore, the networked environments discussed in FIG. 7 are for illustration purposes only. Embodiments are not limited to the example services, applications, engines, modules or processes.

Figure 8:
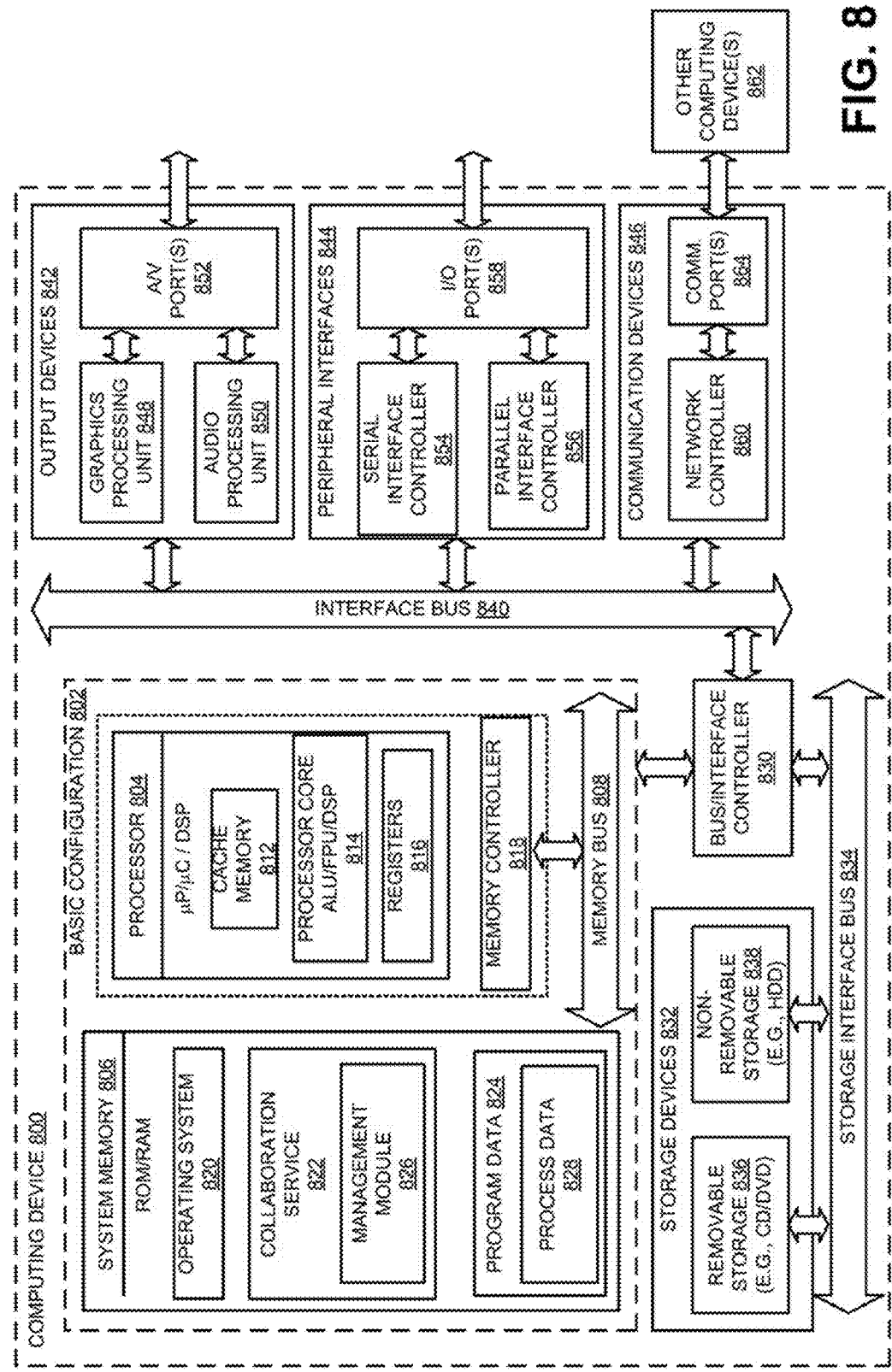
FIG. 8 illustrates a general purpose computing device, which may be configured to provide deconstructing and rendering of a web page into a native application experience, arranged in accordance with at least some embodiments described herein.

FIG. 8 illustrates a general purpose computing device, which may be configured to provide deconstructing and rendering of a web page into a native application experience, arranged in accordance with at least some embodiments described herein.

For example, computing device 800 may be used as a server, desktop computer, portable computer, smart phone, special purpose computer, or similar device. In an example basic configuration 802, the computing device 800 may include one or more processors 804 and a system memory 806. A memory bus 808 may be used for communicating between the processor 804 and the system memory 806. The basic configuration 802 is illustrated in FIG. 8 by those components within the inner dashed line.

Depending on the desired configuration, the processor 804 may be of any type, including but not limited to a microprocessor (PP), a microcontroller (μC), a digital signal processor (DSP), or any combination thereof. The processor 804 may include one more levels of caching, such as a level cache memory 812, one or more processor cores 814, and registers 816. The example processor cores 814 may (each) include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including but not limited to volatile memory (such as RAM), non-volatile memory (such as ROM, flash memory, etc.) or any combination thereof. The system memory 806 may include an operating system 820, a collaboration service 822, and program data 824. The collaboration service 822 may include a management module 826, which may be an integrated module of the collaboration service 822. In other embodiments, the management module 826 may be an integrated module of a locally installed application of the collaboration service 822 or the management module 826 may be a separate module associated with a third party service configured to serve multiple applications of the collaboration service 822. The management module 822 may be configured to provide deconstructing and rendering of a web page into a native application experience. For example, the management module 822 may provide a server side application programming interface (API) for a mobile user experience, determine a type of a page to be rendered, deconstruct the page into pieces based on the determined type, and the provide the deconstructed pieces of the page to rebuild the page at a mobile client natively, where the page may be rendered on the mobile client with added elements based on the deconstructed pieces to enhance the mobile user experience. The program data 824 may include, among other data, process data 828 such as the deconstructed pieces of the page, as described herein.

The computing device 800 may have additional features or functionality, and additional interfaces to facilitate communications between the basic configuration 802 and any desired devices and interfaces. For example, a bus/interface controller 830 may be used to facilitate communications between the basic configuration 802 and one or more data storage devices 832 via a storage interface bus 834. The data storage devices 832 may be one or more removable storage devices 836, one or more non-removable storage devices 838, or a combination thereof. Examples of the removable storage and the non-removable storage devices include magnetic disk devices such as flexible disk drives and hard-disk drives (HDDs), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 806, the removable storage devices 836 and the non-removable storage devices 838 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 800. Any such computer storage media may be part of the computing device 800.

The computing device 800 may also include an interface bus 840 for facilitating communication from various interface devices (for example, one or more output devices 842, one or more peripheral interfaces 844, and one or more communication devices 846) to the basic configuration 802 via the bus/interface controller 830. Some of the example output devices 842 include a graphics processing unit 848 and an audio processing unit 850, which may be configured to communicate to various external devices such as a display or speakers via one or more A/V ports 852. One or more example peripheral interfaces 844 may include a serial interface controller 854 or a parallel interface controller 856, which may be configured to communicate with external devices such as input devices (for example, keyboard, mouse, pen, voice input device, touch input device, etc.) or other peripheral devices (for example, printer, scanner, etc.) via one or more I/O ports 858. An example communication device 846 includes a network controller 860, which may be arranged to facilitate communications with one or more other computing devices 862 over a network communication link via one or more communication ports 864. The one or more other computing devices 862 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 800 may be implemented as a part of a general purpose or specialized server, mainframe, or similar computer that includes any of the above functions. The computing device 800 may also be implemented as a personal computer including both laptop computer and non-laptop computer configurations.

Example embodiments may also include methods to provide deconstructing and rendering of a web page into a native application experience. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 9:
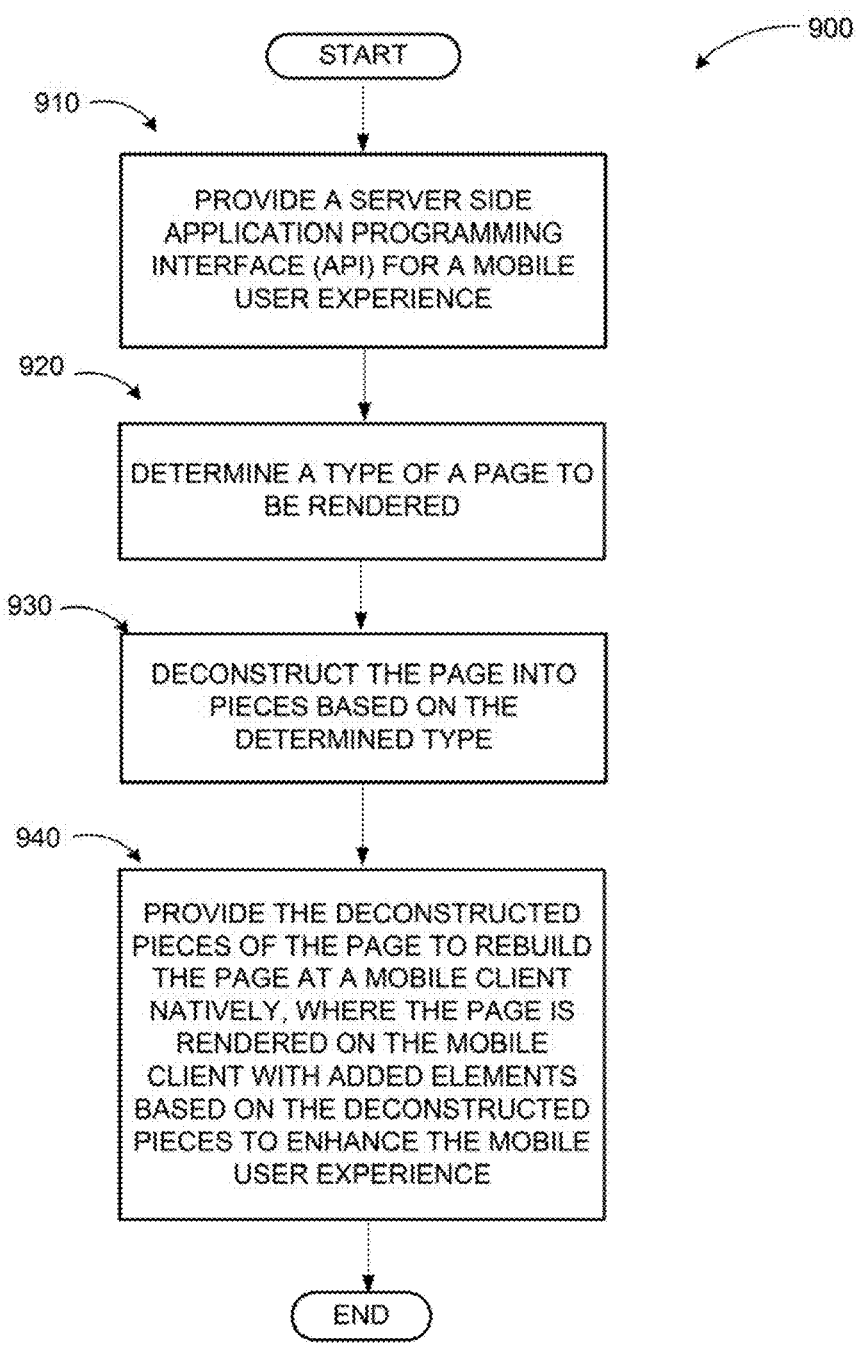
FIG. 9 illustrates a logic flow diagram for an example process to provide deconstructing and rendering of a web page into a native application experience, arranged in accordance with at least some embodiments described herein.

FIG. 9 illustrates a logic flow diagram for an example process to provide deconstructing and rendering of a web page into a native application experience, arranged in accordance with at least some embodiments described herein. Process 900 may be implemented on a computing device, server, or other system. An example system may include a server comprising a communication interface configured to facilitate communication between a collaboration service and a mobile client of the collaboration service that is being executed on a device, a memory configured to store instructions, and one or more processors coupled to the memory and the communication interface and configured to execute a management module. The management module may be configured to deconstruct and render a web page into a native application experience.

Process 900 begins with operation 910, where the management module may be configured to provide a server side application programming interface (API) for a mobile user experience. At operation 920, the management module may determine a type of a page to be rendered. The type of page may include a site page, a group page, a blog page, or a video channel page hosted by the collaboration service, for example.

At operation 930, the management module may deconstruct the page into pieces based on the determined type. The deconstructed pieces of the page may include one or more of a service view, a tab view, a page view, and a navigation view. In one embodiment, the management module may deconstruct the entire page into the deconstructed pieces. In another embodiment, the management module may deconstruct only portions of the page in a hybrid fashion.

At operation 940, the management module may provide deconstructed pieces of the page to the client such that the page may be rebuilt at the client natively. The page may be rendered on the mobile client with added elements based on the provided deconstructed pieces. For example, the mobile client may construct a base user experience that is familiar to the user. Then, based on the determined page type to be rendered and the available deconstructed pieces for the site and/or page provided by the management module, the mobile client may add elements to or detract elements from the user experience to highlight the most desirable and/or compatible components and features of the page to ensure a satisfying mobile user experience. For example, the added elements based on the deconstructed pieces of the service view may include a tab bar comprising one or more tabs; the added elements based on the deconstructed pieces of the tab view may include one or more pivots that each comprise a list of content items associated with the respective pivot; the added elements based on the deconstructed pieces of the page view may include a header, an action bar, and an activity feed; and the added elements based on the deconstructed pieces of the navigation view may include pinned content and one or more links.

The operations included in process 900 are for illustration purposes. Deconstructing and rendering of a web page into a native application experience may be implemented by similar processes with fewer or additional steps, as well as in different order of operations using the principles described herein. The operations described herein may be executed by one or more processors operated on one or more computing devices, one or more processor cores, specialized processing devices, and/or general purpose processors, among other examples.

According to examples, a means for providing deconstructing and rendering a web page into a native application experience is described. The means may include a means for providing a server side application programming interface (API) for a mobile user experience; a means for determining a type of a page to be rendered; a means for deconstructing one or more portions of the page programmatically into pieces based on the determined type of the page; and a means for providing the deconstructed pieces of the one or more portions of the page to rebuild the page at a mobile client natively, where the page is rendered on the mobile client with one or more added elements based on the deconstructed pieces to enhance the mobile user experience.

According to some examples, a method to provide deconstructing and rendering a web page into a native application experience is described. The method may include providing a server side application programming interface (API) for a mobile user experience; determining a type of a page to be rendered; deconstructing one or more portions of the page programmatically into pieces based on the determined type of the page; and providing the deconstructed pieces of the one or more portions of the page to rebuild the page at a mobile client natively, where the page is rendered on the mobile client with one or more added elements based on the deconstructed pieces to enhance the mobile user experience.

According to other examples, deconstructing the page into pieces based on the determined type further may include deconstructing an entirety of the page to generate the deconstructed pieces. The type of the page to be rendered may include one or more of a site page, a group page, a blog page, and a video channel page hosted by a collaboration service. Deconstructing the page into pieces based on the determined type may include deconstructing the page into one or more of a service view, a tab view, a page view, and a navigation view. The added elements based on the deconstructed pieces of the service view may include a tab bar comprising one or more tabs.

According to further examples, the tab view may be displayed within the mobile user experience in response to a user selection of the one or more tabs. The added elements based on the deconstructed pieces of the tab view may also include one or more pivots that each comprise a list of content items associated with the respective pivot. Each content item and metadata associated with each content item may be displayed as a card within the list of content items, the metadata including one or more of a name, an icon, a type, any activity and/or updates associated with the content item, and a following status of the content item. The page view may be displayed within the mobile user experience in response to a user selection of a card. The added elements based on the deconstructed pieces of the page view may include a header, an action bar, and an activity feed. Selection of a navigation feature within the action bar displays the navigation view, and the added elements based on the deconstructed pieces of the navigation view may include pinned content and one or more links.

According to other examples, a server to provide deconstructing and rendering a web page into a native application experience is described. The server may include a communication interface configured to facilitate communication between a collaboration service and a mobile client of the collaboration service that is locally installed on a device; a memory configured to store instructions; and one or more processors coupled to the memory and configured to execute a management module. The management module may be configured to provide a server side application programming interface (API) for a mobile user experience; determine a type of a page to be rendered; deconstruct the page into pieces based on the determined type, wherein the deconstructed pieces of the page include one or more of a service view, a tab view, a page view, and a navigation view; and provide the deconstructed pieces of the page to the mobile client in order to rebuild the page at the mobile client natively, where the page is rendered on the mobile client with added elements based on the deconstructed pieces to enhance the mobile user experience.

According to some examples, the added elements based on the deconstructed pieces of the service view may include a tab bar comprising one or more tabs. The added elements based on the deconstructed pieces of the tab view may include one or more pivots that each comprise a list of content items associated with the respective pivot. The added elements based on the deconstructed pieces of the page view may include a header, an action bar, and an activity feed. The added elements based on the deconstructed pieces of the navigation view may also include pinned content and one or more links. The management module may be an integral module of the collaboration service, an integral module of the mobile client locally installed on the device, or a separate module associated with a third party service configured to serve multiple clients hosted by the collaboration service.

) According to further examples, a computer readable memory device with instructions stored thereon to provide deconstructing and rendering a web page into a native application experience is described. The instructions may include providing a server side application programming interface (API) for a mobile user experience; determining a type of a page to be rendered; deconstructing the page into pieces based on the determined type; and providing the deconstructed pieces of the page to rebuild the page at a mobile client natively, where the page is rendered on the mobile client with added elements based on the deconstructed pieces to enhance the mobile user experience.

According to yet other examples, the instructions may further include providing a custom mobile user experience in response to a determination that there is no content associated with the page to be rendered. The instructions may also include providing a custom mobile user experience in response to a determination that there is an error associated with the page to be rendered; and providing access to a feedback mechanism with the custom mobile user experience.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to provide deconstructing and rendering a web page into a native application experience, the method comprising:
   providing a server side application programming interface (API) for a mobile user experience;
   determining a type of a page to be rendered;
   deconstructing one or more portions of the page programmatically into pieces based on the determined type of the page, the deconstructed pieces representing different views of the page; and
   providing the deconstructed pieces of the one or more portions of the page to rebuild the page at a mobile client natively, wherein the page is rendered on the mobile client with one or more added elements based on the deconstructed pieces to enhance the mobile user experience, wherein a type of the one or more added elements vary based on a view of the page represented by at least one of the deconstructed pieces.

2. The method of claim 1, further comprising:
   deconstructing an entirety of the page to generate the deconstructed pieces.

3. The method of claim 1, wherein deconstructing the one or more portions of the page into pieces based on the determined type comprises:
   deconstructing the page into one or more of a service view, a tab view, a page view, and a navigation view.

4. The method of claim 3, wherein the added elements based on the deconstructed pieces of the service view include a tab bar comprising one or more tabs.

5. The method of claim 4, wherein the tab view is displayed within the mobile user experience in response to a user selection of the one or more tabs.

6. The method of claim 3, wherein the added elements based on the deconstructed pieces of the tab view include one or more pivots that each comprise a list of content items associated with the respective pivot.

7. The method of claim 6, wherein each content item and metadata associated with each content item is displayed as a card within the list of content items, the metadata including one or more of a name, an icon, a type, any activity and/or updates associated with the content item, and a following status of the content item.

8. The method of claim 7, wherein the page view is displayed within the mobile user experience in response to a user selection of a card.

9. The method of claim 3, wherein the added elements based on the deconstructed pieces of the page view include a header, an action bar, and an activity feed.

10. The method of claim 9, wherein selection of a navigation feature within the action bar displays the navigation view, and the added elements based on the deconstructed pieces of the navigation view include pinned content and one or more links.

11. The method of claim 1, wherein the type of the page to be rendered includes one or more of a site page, a group page, a blog page, and a video channel page hosted by a collaboration service.

12. A server to provide deconstructing and rendering a web page into a native application experience, the server comprising:
   a communication interface configured to facilitate communication between a collaboration service and a mobile client of the collaboration service that is locally installed on a device;
   a memory configured to store instructions; and
   one or more processors coupled to the memory and configured to execute a management module, wherein the management module is configured to:
   provide a server side application programming interface (API) for a mobile user experience;
   determine a type of a page to be rendered;
   deconstruct the page into pieces based on the determined type, wherein the deconstructed pieces of the page represent different views of the page and include one or more of a service view, a tab view, a page view, and a navigation view; and
   provide the deconstructed pieces of the page to the mobile client in order to rebuild the page at the mobile client natively, wherein the page is rendered on the mobile client with added elements based on the deconstructed pieces to enhance the mobile user experience, wherein a type the one or more added elements vary based on a view of the page represented by at least one of the deconstructed pieces.

13. The server of claim 12, wherein the added elements based on the deconstructed pieces of the service view include a tab bar comprising one or more tabs.

14. The server of claim 12, wherein the added elements based on the deconstructed pieces of the tab view include one or more pivots that each comprise a list of content items associated with the respective pivot.

15. The server of claim 12, wherein the added elements based on the deconstructed pieces of the page view include a header, an action bar, and an activity feed.

16. The server of claim 12, wherein the added elements based on the deconstructed pieces of the navigation view include pinned content and one or more links.

17. The server of claim 12, wherein the management module is one of:

an integral module of the collaboration service;
an integral module of the mobile client locally installed on the device; and
a separate module associated with a third party service configured to serve multiple clients hosted by the collaboration service.

18. A computer readable memory device with instructions stored thereon to provide deconstructing and rendering a web page into a native application experience, the instructions comprising:
providing a server side application programming interface (API) for a mobile user experience;
determining a type of a page to be rendered;
deconstructing the page into pieces based on the determined type, the deconstructed pieces representing different views of the page and; and
providing the deconstructed pieces of the page to rebuild the page at a mobile client natively, wherein the page is rendered on the mobile client with added elements based on the deconstructed pieces to enhance the mobile user experience, wherein a type of the one or more added elements vary based on a view of the page represented by one of the deconstructed pieces.

19. The computer readable memory device of claim 18, wherein the instructions further comprise:
providing a custom mobile user experience in response to a determination that there is no content associated with the page to be rendered.

20. The computer readable memory device of claim 18, wherein the instructions further comprise:
providing a custom mobile user experience in response to a determination that there is an error associated with the page to be rendered; and
providing access to a feedback mechanism with the custom mobile user experience.

* * * * *